Figure 1:
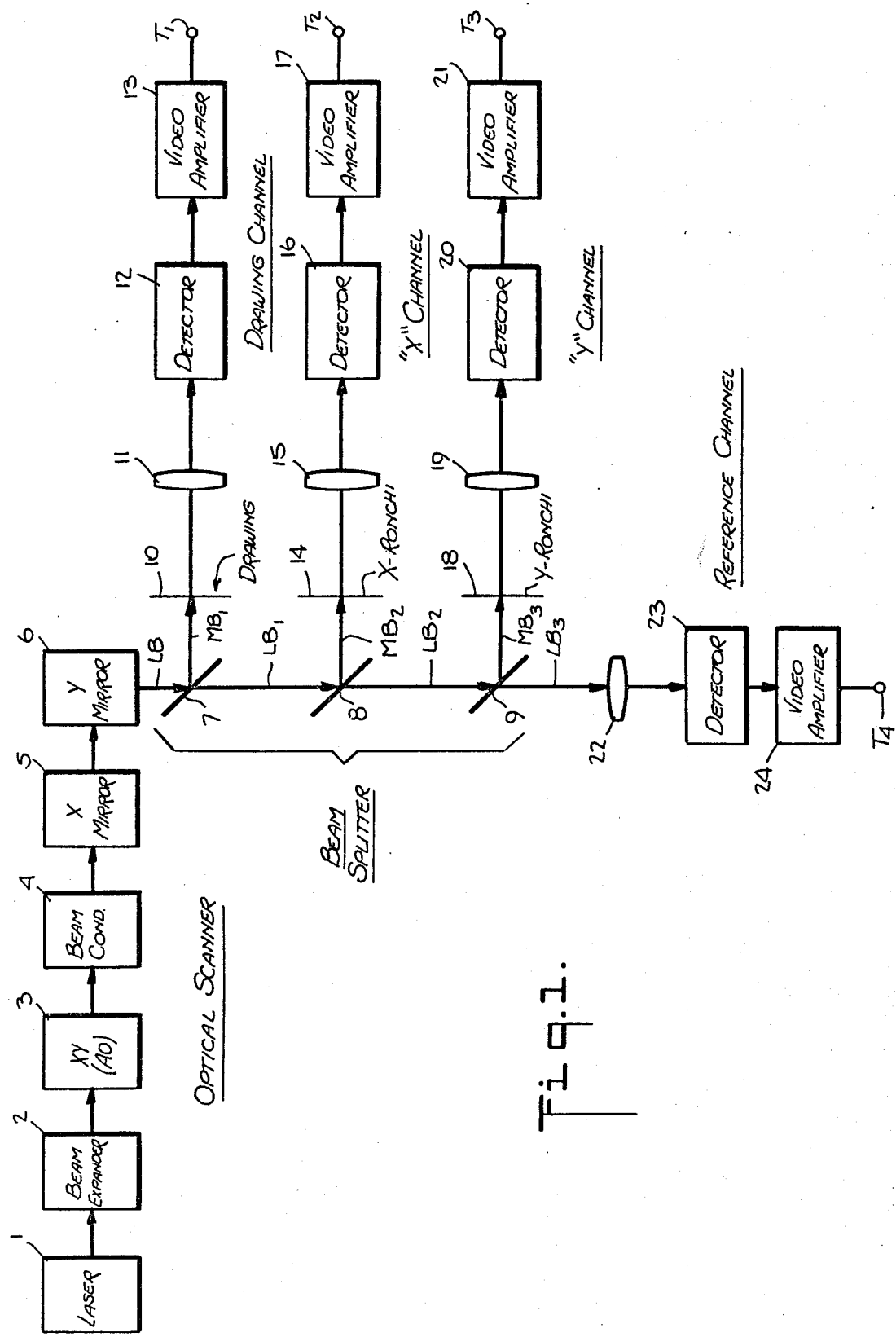

United States
Altman

4,193,087
Mar. 11, 1980

[54] SYSTEM FOR AUTOMATICALLY DIGITIZING ENGINEERING DRAWINGS

[75] Inventor: Norman G. Altman, Stamford, Conn.

[73] Assignee: Altman Associates, Inc., Stamford, Conn.

[21] Appl. No.: 908,374

[22] Filed: May 22, 1978

[51] Int. Cl.$^2$ .............................................. H04N 1/10
[52] U.S. Cl. ...................... 358/93; 250/202
[58] Field of Search ................. 358/93, 256, 294, 903; 235/470, 471; 340/146.3 D, 146.3 H, 146.3 AE, 146.3 AH; 250/202

[56] References Cited
U.S. PATENT DOCUMENTS

| | | | |
|---|---|---|---|
| 3,050,581 | 8/1962 | Bomba et al. | 358/256 |
| 3,218,441 | 11/1965 | Dersch et al. | 235/471 |
| 3,265,812 | 8/1966 | Essinger et al. | 358/294 |
| 3,286,083 | 11/1966 | Nielsen | 358/903 |
| 3,295,105 | 12/1966 | Gray et al. | 340/146.3 H |
| 3,408,458 | 10/1968 | Hennis | 340/146.3 AH |
| 3,502,803 | 3/1970 | Bigenwald et al. | 358/294 |
| 3,624,283 | 11/1971 | Logan | 250/202 |
| 3,725,862 | 4/1973 | Roberts | 340/146.3 H |
| 3,882,273 | 5/1975 | Knox | 358/201 |
| 3,988,610 | 10/1976 | Street | 250/202 |

*Primary Examiner*—Robert L. Griffin
*Assistant Examiner*—Joseph A. Orsino, Jr.
*Attorney, Agent, or Firm*—Michael Ebert

[57] ABSTRACT

An electro-optical computer-controlled scanning system adapted to accurately and rapidly digitize an engineering or other line drawing and to store the digital data, making it possible to reassemble a stored drawing with virtually the same fidelity as the original document. Use is made of a laser beam scanner having a wide angle deflector to sweep the beam in the X and Y directions to a degree sufficient to traverse the X and Y dimensions of the drawing being digitized and a narrow angle deflector for sweeping the beam in the X and Y directions to a degree sufficient to examine any selected region of the drawing. Information is extracted from the drawing in a two-mode procedure, the first carrying out a low-resolution survey along a narrow stripe extending in the X direction across the drawing to determine whether any drawing information is contained therein. If none is found, the scanner skips one stripe width in the Y direction to carry out a survey of the next stripe, and if information is then found, only the X coordinate thereof is noted and stored in the memory. When a survey of a given stripe results in a finding, the system then switches over to operation in a high-resolution line follower mode in which the X coordinate stored during the survey mode serves to ensure that all information contained in an existing drawing line in the surveyed stripe is indicated in only one output vector. In this mode, the system examines each drawing line to determine its radius of curvature and singularities (nodes, branch points and termini), each line being defined as a vector. During such tracking, the coordinates and number of members of each node and branch points are determined and stored. The survey and line following procedures are repeated until the entire drawing is digitized.

12 Claims, 2 Drawing Figures

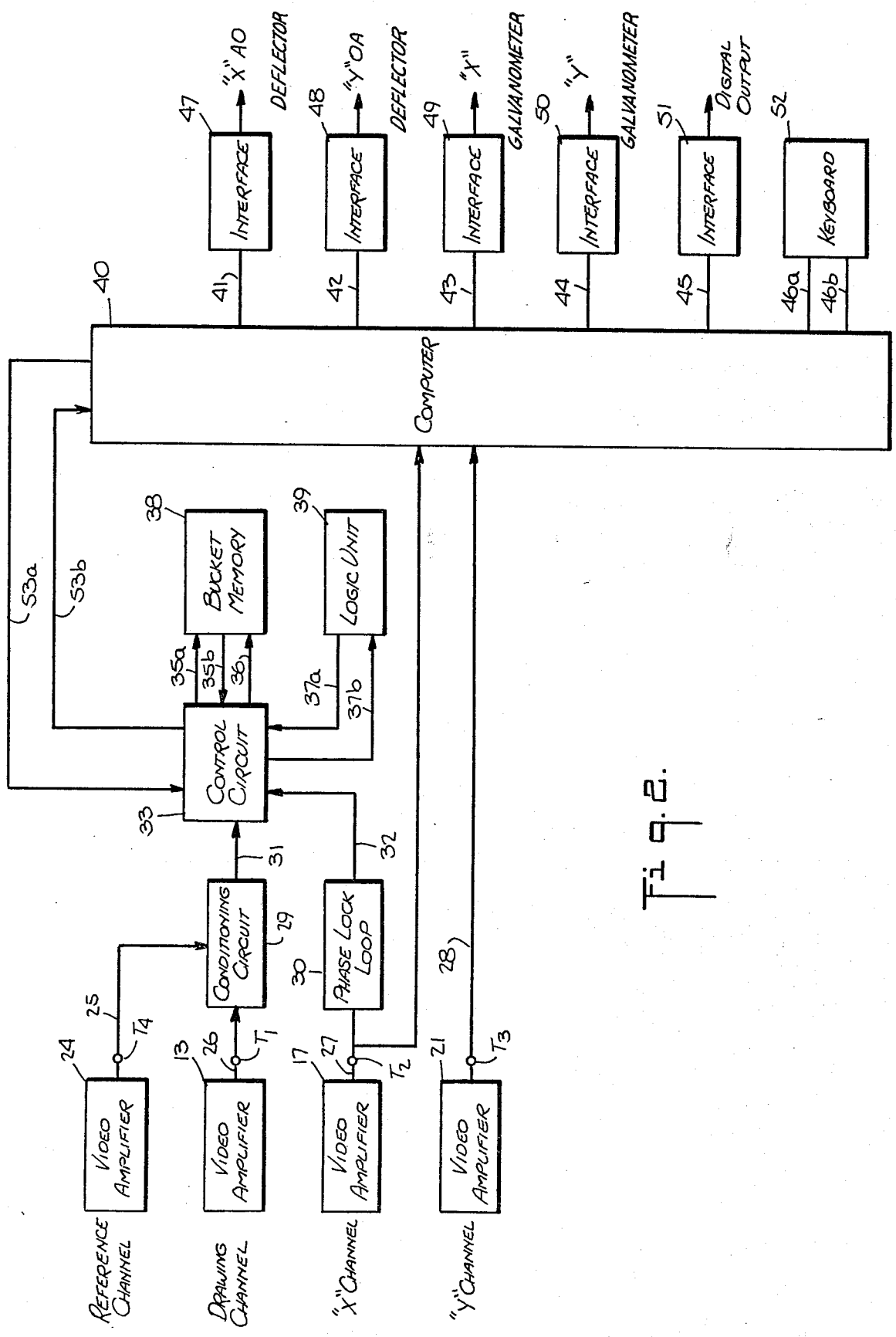

SYSTEM FOR AUTOMATICALLY DIGITIZING ENGINEERING DRAWINGS

BACKGROUND OF INVENTION

This invention relates generally to a technique and a system based thereon to automatically digitize engineering drawings and like documents and to store the digitized information in a computer accessible memory for subsequent retreival in order to reconstruct the drawing, and more particularly to a laser-beam scanning system adapted to digitize virtually all information contained in a line drawing, making it possible to thereafter faithfully reconstruct the scanned drawing.

The development in recent years of automatic drafting and computer-aided design has given rise to the concomitant need for the fast, accurate and flexible automatic digitizing of engineering drawings. To facilitate the transition between manual and computer-based systems, one must be able to convert existing hard copy drawings into digital form.

To this end, various types of raster scan systems have heretofore been proposed. One serious drawback of cathode-ray tube scanner-based systems is that, in general, they can function only with microfilm. As a consequence, all engineering drawings to be converted into digital form must first be micro-filmed. If microfilm versions of the drawings do not already exist, the need therefor can be costly and time-consuming.

Presently known laser or light beam scanner systems which make use of a raster scan permit the handling of large size drawings. But such systems are usually quite slow and require at least three minutes per square foot. Moreover, such raster systems scan the entire drawing without discrimination or editing, thereby generating enormous amounts of information. Thus for a typical D size drawing (2'×3'), about 16,000,000 bits of information are generated. While with careful encoding the number of bits can be reduced to about 1.6 million, even this is approximately three times the number of bits that present estimates indicate are essential to delineate a full drawing in point-to-point form.

In known systems, the raster scan output must be elaborately processed in order to determine which series of disconnected dots represent a line. Highly sophisticated "vectorizing" routines are required simply to decide which dot is connectd to which dot. This vectorizing process deteriorates the quality of the reconstructed drawing, as a result of which arcs, circles and curves are frequently recreated as jagged, rather than smooth segments. Furthermore, raster scanning systems, even those operating at three minutes per square foot, have limited resolution, and connection points are frequently missed. Hence the reconstructed drawing is deficient in many respects. For the typical engineering application, such deficiencies cannot be tolerated.

It is fair to say that the conventional and commonly practiced technique for scanning a drawing to extract raw information therefrom and to store this information while still in raw form in a computer memory, and to then manipulate the memorized information in order to vectorize and digitize it, is self-defeating. Inasmuch as the information on the drawing is already vectorized, the proper objective in digitization is to extract the information from a drawing without destroying its inherent vectorization.

Line following systems have been developed to eliminate the problem of vectorization and to obviate the generation of massive amounts of "empty" or valueless digital data. But existing line following techniques are characterized by line-following rates measured in just a few inches per second.

SUMMARY OF INVENTION

In view of the foregoing, the main object of the present invention is to provide a laser-beam scanning technique and a system based thereon to accurately digitize engineering and other line drawings at a rapid rate.

More particularly, it is an object of this invention to digitize a drawing by means of a high-speed line following technique to eliminate the costly and time-consuming software manipulations dictated by computer "vectorizing."

Also an object of this invention is to provide a system that ensures the capture of all information on the line drawing, thereby making it possible to reconstitute a stored drawing with virtually the same fidelity as the original document.

Still another object of this invention is to provide a laser-beam scanning system capable of digitizing a square foot of line drawing at an average rate of no more than two seconds, without regard to whether the scanned document is a full-scale original or in a reduced-scale microfiom format.

Briefly stated, these objects are accomplished in a system in accordance with the invention which makes use of a high-speed random access scanner/line follower operating in conjunction with a dedicated computer in a continuous two-way communication arrangement, the scanner extracting information from the drawing in a two-mode procedure.

In the following summary of this two-mode procedure, we shall assume that the drawing to be digitized s a full-size drawing with an X-axis extending horizontally and a Y-axis extending vertically. It is to be understood, however, that with line drawing on microfilm, the same procedure is used, but with the dimensions appropriately scaled down.

Survey-Mode

First, a high-speed survey having relatively low-accuracy is made along a narrow stripe extending in the X direction across the drawing. This survey determines whether there is any information at all in the surveyed stripe. If none is found, no further time is wasted and the scanner steps one stripe width in the Y-direction to survey the adjacent horizontal stripe across the drawing. If information is then found, only the X-coordinate thereof is noted and stored in the memory. Used properly, this memorized information insures that no isolated data (which may be in the form of small details or alpha numerics) is left undigitized without requiring that a full bit map be generated and manipulated.

Line-Follower-Mode

When data is found after surveying a given stripe, the system automatically switches over to a high-speed line-follower mode. It uses the X coordinates stored during the survey procedure to insure that all information contained in an existing drawing line in the surveyed stripe is indicated in one and only one output vector. In this line-follower mode, the system examines each drawing line to determine its radius of curvature and singularities (nodes, branch points and termini).

Each line is then defined as a vector in the following manner:

(1) For straight lines or line segments: end point coordinates and line thickness.
(2) For arcs: radii of curvature and their centers are added.

During line tracking, the coordinates and number of members of each node and branch point are determined and stored. All nodes and branch points are fully explored to make sure that each line element is followed to its terminus so that it can be fully defined by its termini and radius and center of curvature, if applicable. The survey and line-following procedures are repeated until the entire drawing is traversed. Overlap is provided between strips to insure that extended line vectors will be tracked through their full length.

It is to be noted that the random access scan used for line-following has sufficient accuracy and resolution to insure that the tracking will be carried out with no discontinuities between tracking areas. In a preferred embodiment, the absolute accuracy of the scanner over the entire field of view is 0.010". However, this covers the worst case diagonal from corner to corner. In small areas, where the scanner travels from one section to the next immediate overlapping section, the discontinuity is less than 0.003", which is of the order of ⅓ of a normal drawing line width. This control of discontinuities insures that the system will properly process lines and arcs that extend beyond an individual stripe. When the entire line or arc is reassembled from the individual segments, the result is a smooth continuous line, not a disjointed array of individual segments.

To meet all these requirements, the deflection system must operate at very high speeds to supply an average digitizing rate of 70 in$^2$/sec. and maintain an accuracy of 0.01" as well as a repeatability of 0.003" over the entire field of view.

Currently, there is not available a single, practical scanning technique that will meet all of these requirements simultaneously. However, by combining several scanning techniques, it becomes feasible to cover a large area with high-speed detailed examination.

The present invention, as will be later explained in greater detail, uses the following combination of two scanners to achieve the desired coverage and speed:

Scanner I

Acousto-optical (AO) deflectors provide very high-speed, high-resolution scanning. Typically, an acousto-optical deflector will respond to a step command within one microsecond when used to scan an area 70 resolution elements by 70 resolution elements. In a typical full-scale drawing, with a line width of 0.01", the system resolution element is chosen to equal the minimum line width. Thus the 70×70 resolution element coverage corresponds to 0.7"×0.7" in this case.

Scanner II

In order to shift the region scanned by the acousto-optical deflectors so that any region of the drawing can be scanned, a pair of orthogonal mirrors is used, each mirror being driven by its own rotating mechanism. Hence by this combination of the two mirrors, the angular coverage is greater than 30°×30°. With appropriate optics, the optical system will scan a drawing up to 3'×4'.

OUTLINE OF DRAWINGS

For a better understanding of the invention as well as other objects and further features thereof, reference is made to the following detailed description to be read in conjunction with the accompanying drawings, wherein:

FIG. 1 is a block diagram of the optical system and the detectors associated therewith for converting optical information derived from a drawing to be digitized into electrical signals which are fed into video amplifiers; and FIG. 2 illustrates in block form the computer arrangement associated with the optical system shown in FIG. 1 for processing the electronic signals obtained from the video amplifiers to generate the required digital output in vector form.

DESCRIPTION OF INVENTION

Optical Scanning

Referring now to FIG. 1, there is shown a laser source 1 generating a typical laser beam which is projected through a beam expander 2 to produce a shaped beam suitable for an acousto-optic deflector 3. Acousto-optic (AO) deflector 3 effects small angle deflection in the X and Y directions and functions to generate a required small region scanning pattern. AO deflector 3 directs the laser beam toward an optical beam conditioner 4 adapted to allow the beam to undergo large angle X and Y deflection by means of galvanometer-driven mirrors 5 and 6, respectively.

The laser beam, after travelling through beam expander 2, AO deflector 3, beam conditioner 4 and X and Y mirror deflectors 5 and 6, is projected from deflector 6. The projected beam LB now contains both the small angle X-Y deflections produced by the AO deflector and the large angle X-Y deflections produced by the mirrors. Beam LB passes serially through three beam splitters 7, 8 and 9. Each of these splitters functions to divide the beam incident thereto into two exiting components, one going straight through the splitter, the other being reflected 90° from the surface of the splitter. The beam splitters are conventional and are of the type included in various known forms of optical apparatus.

We shall first consider beam splitter 7 which receives laser beam LB from deflecting mirror 6. This beam is divided into a straight-line beam component LB$_1$ which is transmitted toward beam splitter 8 and a right angle beam component, hereinafter referred to as the main beam MB$_1$, in that this beam is directed toward a drawing 10 to be digitized. Main beam MB$_1$ acts to scan this drawing. In the arrangement shown, drawing 10 is a transparency; hence the amount of energy in the scanning beam conducted through this transparency depends on the varying density of the transparency, as determined by the drawing lines therein. Thus the drawing acts to modulate the scanning beam.

Alternatively, by means of techniques well known in the art, scanning of opaque drawings can be effected to derive information therefrom. In this instance, the amount of energy derived is determined by variations in reflectivity resulting from the lines and blank areas in the drawing. The collecting lens and the detector for the reflected energy must, of course, be on the same side of the drawing as the beam incident thereto.

In the drawing channel, the main beam MB$_1$ scanning transparent drawing 10 and transmitted therethrough is collected by a suitable lens 11 which focuses the beam onto a detector 12. Detector 12 may be any standard solid-state or other form of transducer adapted to convert varying beam energy incident thereto into a corresponding electrical signal. This signal is applied to a drawing-channel video amplifier 13 whose output appears at terminal $T_1$.

The straight line beam component $LB_1$ emerging from beam splitter 7 is directed toward splitter 8 which in turn divides this component into a straight line component $LB_2$ and a right angle main beam component $MB_2$ which is directed through an "X" channel ronchi 14. Ronchi 14 is a ruled grating with alternate opaque and transparent lines, the main beam energy modulated thereby being collected by a lens 15 which focuses the beam onto a detector 16. The electrical signal from detector 16 is applied to a suitable "X" ronchi video amplifier 17 whose output appears at terminal $T_2$. By processing this output in a manner to be later described, one can precisely determine the X position of the beam.

The straight line beam component $LB_2$ from beam splitter 8 is directed toward splitter 9 which in turn divides this component into a straight line component $LB_3$ and a right angle main beam component $MB_3$ which is directed in a "Y"-channel through a "Y"-ronchi 18. The main beam energy modulated by "Y"-ronchi 18 is collected by a lens 19 which focuses this beam onto a detector 20 generating a corresponding electrical signal that is applied to "Y"-ronchi video amplifier 21 whose output appears at terminal $T_3$. By processing this output in a manner to be later described, one can precisely determine the Y position of the beam.

The straight line beam component $LB_3$ from splitter 9 is collected by a lens 22 which focuses this beam onto a detector 23 whose signal is fed to a reference channel video amplifier 24, the output of which appears at terminal $T_4$. This output, when properly processed in a manner to be later described, serves to monitor the level of energy in the beam LB travelling from deflector 6 serially through beam aplitters 7, 8 and 9. By monitoring this energy level, it becomes possible to compensate for variations in the output of laser source 1 and the transmission efficiency of the optical elements 2 through 6 associated with this source.

Signal Processing

Referring now to FIG. 2, there is shown the computer arrangement associated with video amplifiers 13, 17, 21 and 24 for processing the outputs thereof appearing at terminals $T_1$ to $T_4$ of the drawing, "X," "Y" and reference channels, respectively.

Terminal $T_1$ is connected to one input of a conditioning circuit 29 which acts to compensate the output 26 of the drawing-channel video amplifier 24 for variations in laser beam intensity. This is effected by applying the output 25 of the reference channel video amplifier 24, which appears at terminal $T_4$, to the other input of the conditioning circuit.

The output 27 of the "X"-ronchi video amplifier 17, which appears at terminal $T_2$ performs two functions. In the survey mode (which, as explained later, requires that the X galvanometer-drive mirror 5 be controlled by a ramp input to attain the highest practicable scan speed while maintaining linearity), the output 27 from the X-channel serves to control a phase lock loop 30 so that its output 32 provides a clock signal which is maintained in synchronism with the crossing of the scan beam with the individual edges of the "X"-ronchi 14.

During the line tracking mode, output 27 serves to furnish data to determine the precise X coordinate of the beam on the drawing 10 being digitized. From this information, the X end point coordinate of the vectorized information can be generated. Similarly, output 28 of the "Y"-channel provides data from which the Y coordinate of the vector end point can be precisely determined.

A computer 40 is provided which communicates with a control circuit 33 through a data line 53a and a command line 53b. Control circuit 33 is coupled to receive a drawing channel input 31 from conditioning circuit 29 and an "X"-channel input 32 from phase lock loop 30. The control circuit, in response to these inputs, generates the information to be stored in a bucket memory 38 through a data line 35a. Control circuit 33 is also used to extract information from bucket memory 38 through a data line 35b and to modify this information, as required, by means of an arithmetic logic unit 39 through communication and data lines 37a and 37b, respectively.

Computer 40 is connected through its output line 41 and an interface 47 to the "X" AO deflector and through its output line 42 and an interface 48 to the "Y" AO deflector 3.

The computer is also connected through its output line 43 and an interface 49 to the "X" galvanometer deflector 5 and through its output line 44 to the "Y" galvanometer deflector 6.

The vector information generated by the digitizing process resulting from the scanning of drawing 10 is yielded by the computer through its data line 45 and an interface unit 51. This output is in a form suitable for storage in a magnetic tape, a magnetic disc or any other appropriate means for mass storage. To provide man/machine communication, the computer is linked to a keyboard printer 52 by data lines 46a and 46b.

Operation

The digitizing system operates in two modes, the first being a survey mode and the second a line-following mode. During the survey mode, the "X" galvanometer mirror 5 is caused to sweep the laser beam horizontally across the entire X dimension of drawing 10, starting at one extreme of the Y position control. With galvanometer driven scanning means of a type commercially available, it is possible to sweep a single scan as much as 48 inches in length in approximately one millisecond, so that this operation can be carried out at high speed.

During this high-speed survey, output 26 of the drawing channel will indicate whether any lines in drawing 10 have been crossed by the scanning laser beam, the output 32 of phase lock loop 30 providing information through control circuit 33 from which the X coordinates of any such lines can be determined.

Since the invention is for the purpose of digitizing line drawings, the detection of line information will be expressed in terms either of the presence or absence of a line, there being no shades of gray. Hence all data to be stored as a result of a scan in the survey mode can be represented as a binary ONE to indicate the presence of a line and a binary ZERO to indicate the absence thereof. In actual operation, therefore, whenever a line is detected in the course of a survey scan, a binary ONE is placed in memory.

Bucket memory 38 is arranged to have one storage cell or bucket for each resolvable position along the scanned X dimension of the drawing. More specifically, for a drawing 48 inches wide having a minimum line width and a minimum line spacing of 0.1 inches, there will be 4800 resolvable elements along a 48 inch scanned dimension. Consequently, the bucket memory will have 4800 memory cells or buckets numbered from 0000 to 4799 (or actually the binary representations thereof).

Thus during the first scan of a survey, as each item of information (i.e., each drawing line) is detected, a binary ONE is deposited in the bucket corresponding to the coordinate at which the line was found. When the lines are thick or non-vertical, this requires that binary ONE's be stored in adjacent buckets.

After a single X survey scan is made, the "Y" AO deflector is advanced one resolution element. In the case of a typical full-scale drawing, this would represent 0.01 inches in the drawing. The survey is then continued by driving the X scan mirror 5 to examine the line adjacent to the first survey scan line. When lines on the drawing are detected during the second scan, control circuit 33, proper guided by computer 40, will extract the information from the bucket in bucket memory 38 corresponding to the coordinate at which the drawing lines are detected and pass this information via line 37b to logic unit 39.

Arithmetic logic unit 39 will increase the number which was stored in the examined bucket (which number represents the accumulated number of sensed information points at that coordinate on previous survey scans in the existing survey mode). This updated information is then passed by arithmetic logic unit 39 back to control circuit 33 via line 37a. From here it is put back into the appropriate bucket of bucket memory 38 via data line 35a. Address line 36 acts to ensure that the proper bucket is being used.

The process of scanning line-by-line by means of the galvanometer-driven "X" mirror 5 operating at its highest speed of scan and advancing the scan line one resolution-element at a time by means of the "Y" AO deflector 3 proceeds for the full range of the "Y" AO travel. For a practical system employing commercially-available components, the number of "Y" AO steps which can be used is about 60. This means that the individual buckets in the bucket memory unit will be capable of storing numbers from 00 to 59 or the binary equivalent thereof.

The completion of a survey of 60 horizontal lines in the above-described manner by the system operating in the survey mode constitutes the survey of a stripe, the information from which is stored in the bucket memory. Thus the term "stripe" as used herein means a narrow band constituted by a predetermined number of scan lines. At this point, the system automatically switches over to the line-following mode in the course of which the information, if any, which has been found in the survey of the stripe is converted into a series of vectors by following the drawing lines which generated the stored information.

The line following itself can be carried out by one of several standard closed loop techniques, with computer 40 commanding the proper position of the laser beam on the drawing 10 being digitized. The appropriate commands are rendered through lines 41 through 44 interfacing with the "X" and "Y" AO deflector 3 and the "X" and "Y" galvanometer-driven mirrors 5 and 6.

During this line-following procedure, the information in the bucket memory 38 is used in the following manner:

(1) The memory makes sure that only areas containing data are subjected to the line-following procedure, this being done by forbidding the examination of any area lacking information in the related X coordinate bucket.

(2) Whenever a data point is tracked in the line-following mode, the memory bucket corresponding to the X coordinate of that point has its count reduced by a process which is the reverse of that described above for raising the count in the bucket.

To further explain procedure (2), control circuit 33 under the command of computer 40 will address bucket memory 38 through address line 36, and it will receive the count stored in the addressed bucket through data line 35b and transfer this count through line 37b to arithmetic unit 39 in which the count will be decreased by one. This decreased number will then be transferred back from arithmetic unit 39 through line 37a, control circuit 33 and data line 35a to bucket memory 38 to reside in the bucket called up by address line 36.

Each line will be followed until one of the following events happens: (a) the line terminates; (b) the line is joined by another line; (c) the line reaches the end of the surveyed stripe. In any one of these events, computer 40 notes the coordinates of the singularities (i.e., a terminus, a branch point or a stripe crossing). Line termini and line branch points are considered as vector termini and are reported out as part of the standard vector output in end point coordinate form on output line 45. Stripe crossing is an intermediate datum and is stored in computer 40 to be used when line-following the adjacent stripe so that vectors which extend through two or more stripes can be reported out as individual vectors defined by only two end points.

During line following, by means of standard techniques well known in the art, the slope of the line being tracked and the rate of change of this slope are continuously monitored. Lines with constant slope are considered as straight lines and reported as such. Lines with a constant rate of slope change are considered as arcs of circles and are reported as such, computer 40 calculating the radius of curvature and center of curvature of each vectorial arc as part of the output information. Points of inflection, change of slope rate and/or points of tangency are considered as vectorial ended points and these are reported as such.

Using the above-described techniques, the drawing is digitized stripe by stripe, each stripe being the height of the maximum excursion of the "Y" OA deflector. The digitizing for each stripe starts with a survey scan of the entire stripe, and the X coordinate of any information found is stored in the appropriate buckets in bucket memory 38. If no information is found in that stripe, the survey of the adjacent stripe is started immediately by an appropriate advance of the "Y" mirror 6. If information is found, it is digitized by converting it to vector form by use of line-following techniques through the stripe, employing appropriate bookkeeping techniques to subtract from bucket memory 38 a count from the appropriate bucket for each data point tracked during the line-following mode.

Features

The following is a brief review of the unique features of a system in accordance with the invention:

1. To ensure that all data on the drawing is detected, use is made of a high-speed surveillance scan.

2. To ensure that the detected data can be filed and retrieved in a usable form without slowing down either the survey-mode or the line-following mode, use is made of a high-speed memory system.

3. In contradiction to the conventional technique of extracting the information from the drawing and putting it in a computer digital memory in the form of a bit map which must then be manipulated by means of software, use is made of the drawing itself as a "working memory."

4. The use of calibrating techniques embedded in object space to effectively linearize the scanning technique employed whereby the precise coordinates of any point in object space can be determined and addressed.

While there has been shown and described a preferred embodiment of a system for automatically digitizing engineering drawings in accordance with the invention, it will be appreciated that many changes and modifications may be made therein without, however, departing from the essential spirit thereof.

I claim:

1. An electro-optical computer-controlled scanning system adapted to accurately and rapidly digitize an original engineering or other line drawing having a horizontal X dimension and a vertical Y dimension and to store the resultant digital data, making it possible to reassemble a stored drawing with virtually the same fidelity as the original drawing, said system comprising:
   A a laser beam scanner having a wide-angle deflector to sweep the beam in X and Y directions to a degree sufficient to traverse the entire X and Y dimensions of the drawing being digitized and a narrow-angle deflector whose operation is independent of the wide-angle deflector for sweeping the beam in the X and Y directions to a degree sufficient to examine any selected, relatively small region of the drawing; and
   B computer means associated with said scanner and including a digital memory to extract digital information from the line drawing and to store this information to ensure the capture of virtually all information thereon, said means operating in a two-mode procedure, in the first of which the wide-angle deflector operates to make a survey along a narrow stripe extending in the X direction across the entire drawing to determine whether any drawing information is contained therein, the scanner skipping one stripe width in the Y direction if no information is found to carry out a like survey of the next stripe; and if information is then found, only the X coordinate thereof is noted and stored in said memory, the survey being completed when the scanner has skipped to traverse the entire drawing in the Y direction, an automatic switchover to the second mode being made when a survey on a given stripe results in a finding, the second mode being a line follower operation in which the narrow-angle deflector of the scanner operates to examine each drawing line to determine its radius of curvature and singularities, each line then being thereby defined as a vector, this two-mode procedure being repeated until the entire drawing is examined and digitized.

2. A system as set forth in claim 1, wherein said line singularities are constituted by nodes, branch points and termini, the coordinates and numbers of members of each node and branch points being determined and stored in said line follower mode.

3. A system as set forth in claim 1, wherein said small angle deflector is an acousto-optical deflector.

4. A system as set forth in claim 3, wherein said laser beam is derived from a source and is directed therefrom toward said acousto-optical deflector through a beam expander.

5. A system as set forth in claim 4, wherein said wide angle deflector is constituted by galvanometer-driven mirrors.

6. A system as set forth in claim 1, wherein said drawing is a transparency, and the scanner beam is directed through a series of three beam splitters to produce three main right-angle beam components, one of which is directed through said drawing, the second through an X-ronchi, and the third a Y-ronchi.

7. A system as set forth in claim 6, wherein the main beam component passing through said drawing and modulated thereby is detected to produce a corresponding signal which is amplified in a drawing channel video amplifier.

8. A system as set forth in claim 6, wherein the main beam component passing through said "X"-ronchi and modulated thereby is detected to produce a corresponding signal which is amplified in an X-ronchi video amplifier.

9. A system as set forth in claim 6, wherein the main beam component passing through said "Y"-ronchi and modulated thereby is detected to produce a corresponding signal which is amplified in a Y-ronchi video amplifier.

10. A system as set forth in claim 6, wherein the scanner beam passing straight through said three beam splitters is detected to produce a reference signal which depends on its intensity and varies with fluctuations in said intensity.

11. A system as set forth in claim 10, wherein said reference signal is applied to a conditioning circuit to which said drawing channel signal is also applied to compensate said drawing channel signal for said fluctuations.

12. A system as set forth in claim 1, wherein said memory is a bucket memory.

* * * * *